United States Patent
Roediger et al.

(10) Patent No.: US 7,120,907 B2
(45) Date of Patent: Oct. 10, 2006

(54) UNROLLING LOOPS WITH PARTIAL HOT TRACES

(75) Inventors: Robert Ralph Roediger, Rochester, MN (US); William Jon Schmidt, Rochester, MN (US); Peter Jerome Steinmetz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 511 days.

(21) Appl. No.: 10/650,544

(22) Filed: Aug. 28, 2003

(65) Prior Publication Data

US 2005/0050535 A1 Mar. 3, 2005

(51) Int. Cl.
*G06F 9/45* (2006.01)
*G06F 15/00* (2006.01)

(52) U.S. Cl. .................. 717/160; 717/150; 712/241

(58) Field of Classification Search ........ 717/150–151, 717/158, 160, 130–131; 712/233, 241
See application file for complete search history.

(56) References Cited

U.S. PATENT DOCUMENTS

| | | | | |
|---|---|---|---|---|
| 5,655,122 A | * | 8/1997 | Wu | 717/152 |
| 5,742,803 A | * | 4/1998 | Igarashi et al. | 712/233 |
| 5,862,385 A | * | 1/1999 | Iitsuka | 717/156 |
| 5,901,318 A | * | 5/1999 | Hsu | 717/161 |
| 5,950,003 A | * | 9/1999 | Kaneshiro et al. | 717/130 |
| 6,035,125 A | * | 3/2000 | Nguyen et al. | 717/160 |
| 6,189,141 B1 | * | 2/2001 | Benitez et al. | 717/153 |
| 6,311,324 B1 | * | 10/2001 | Smith et al. | 717/114 |
| 6,567,976 B1 | * | 5/2003 | Wolf | 717/160 |
| 6,651,247 B1 | * | 11/2003 | Srinivasan | 717/161 |
| 6,675,374 B1 | * | 1/2004 | Pieper et al. | 717/141 |
| 6,938,249 B1 | * | 8/2005 | Roediger et al. | 717/160 |
| 6,964,043 B1 | * | 11/2005 | Wu et al. | 717/159 |

OTHER PUBLICATIONS

TITLE: Dynamic Hot data stream prefetching for general-purpose program, author: Chilimbi et al, ACM, Jun. 2002.*
Roediger et al., IBM U.S. Appl. No. 10/282,811, filed Oct. 29, 2002, "Compiler Apparatus and Method for Unrolling a Superblock in a Computer Program".

* cited by examiner

*Primary Examiner*—Antony Nguyen-Ba
(74) *Attorney, Agent, or Firm*—Robert R. Williams

(57) ABSTRACT

Methods and apparatus are disclosed for improved loop unrolling by a compiler. A large class of loops exists for which effective loop unrolling has not previously been performed because they are too large to be completely unrolled, but which do not have a single hot trace that covers an entire loop iteration. The present invention recognizes such loops that have partial hot traces identified using profile data. A set of instructions which constitute a proper superset of the hot trace and a proper subset of the entire loop, and which forms a complete loop iteration is identified. This set of instructions can then be unrolled without unrolling the entire loop.

18 Claims, 9 Drawing Sheets

UNROLLING LOOPS WITH PARTIAL HOT TRACES

RELATED PATENT APPLICATION

The present invention is related to, "Compiler Apparatus and Method for Unrolling a Superblock in a Computer Program", filed as Ser. No. 10/282,811, filed on Oct. 29, 2002, by the same inventors and owned by the current assignee at the time of the invention. The subject matter of Ser. No. 10/282,811 is hereby included by reference in its entirety.

BACKGROUND OF THE INVENTION

1. Field of the Invention

The present invention generally relates to computer systems, and more specifically relates to compilers that generate executable code for computer systems.

2. Description of the Related Art

Since the dawn of the computer age, computer systems have evolved into extremely sophisticated devices, and computer systems may be found in many different settings. Dramatic advances in both hardware and software (e.g., computer programs) have drastically improved the performance of computer systems. Modern software has become very complex when compared to early computer programs. Many modern computer programs have tens or hundreds of thousands of instructions. The execution time (and hence, performance) of a computer program is very closely related to the number of instructions that are executed as the computer program runs. Thus, as the size and complexity of computer programs increase, the execution time of the computer program increases as well.

Unlike early computer programs, modern computer programs are typically written in a high-level language that is easy to understand by a human programmer. Special software tools known as compilers take the human-readable form of a computer program, known as "source code", and convert it into "machine code" or "object code" instructions that may be executed by a computer system. Because a compiler generates the stream of machine code instructions that are eventually executed on a computer system, the manner in which the compiler converts the source code to object code affects the execution time of the computer program.

The execution time of a computer program is a function of the arrangement and type of instructions within the computer program. Loops affect the execution time of a computer program. If a computer program contains many loops, or contains any loops that are executed a relatively large number of times, the time spent executing loops will significantly impact the execution time of a computer program.

In order to optimize the performance of modern computer programs, profilers have been developed to measure the run-time performance of a computer program. Profilers typically generate profile data that estimates how often different portions of the computer program are executed. Using profile data, an optimizer (such as an optimizing compiler) may make decisions to optimize loops in a computer program in order to improve the execution speed of the computer program.

Known methods for using profile data to optimize loops in a computer program do not provide an optimal solution in cases where a single hot trace (that is, a single path through which execution follows for most iterations of a loop) does not extend from a beginning of a loop to an end of the loop. As a result, the prior art may yield inefficiencies in loops that result in a slower execution time for the computer program. Application Ser. No. 10/282,811 teaches a method for improving efficiencies in loops by identifying a hot trace and unrolling that hot trace; however additional improvements in loop efficiencies are needed to maximize performance of the computer system.

SUMMARY OF THE INVENTION

The present invention provides for loop unrolling for a class of loops that have not previously been unrolled. This class of loops comprises loops that are too large to be completely unrolled, and which lack a single hot trace that covers an entire loop iteration.

In an embodiment, a method identifies loops which contain partial hot traces, using profile data. A hot trace comprises a sequence of blocks where, with high probability, control passes from each block to the next block in the sequence. A partial hot trace is a hot trace in a loop that does not cover an entire loop iteration. The method identifies a set of instructions which constitute a proper superset of the partial hot trace and a proper subset of the entire loop and which forms a complete loop iteration. This set of instructions is then unrolled (i.e., duplicated), without unrolling the entire loop.

In an embodiment, an augmentation path set is identified. An augmentation path set has more than one path, or trace, through the augmentation path set, each trace in the augmentation path set having similar likelihood of being executed. A sum of the probabilities of executing each of the traces in the augmentation path set is similar to the probability of executing a particular block in the partial hot trace. Trace likelihood is determined using profile data.

In an embodiment, an augmentation path set lies between a beginning of the loop and a beginning of the partial hot trace. The method augments the partial hot trace by appending the partial hot trace to the augmentation path set, forming an augmented hot trace. Unrolling of the augmented hot trace is then performed as taught for unrolling a hot trace in application Ser. No. 10/282,811.

In an embodiment, an augmentation path set lies between an end of the partial hot trace and an end of the loop. The method augments the partial hot trace by appending the augmentation path set to the end of the partial hot trace, forming an augmented hot trace. Unrolling of the augmented hot trace is then performed as taught for unrolling a hot trace in application Ser. No. 10/282,811.

In an embodiment, an augmentation path set lies between a first portion of the partial hot trace and a second portion of the partial hot trace. The method augments the partial hot trace by inserting the augmentation path set between the first portion of the partial hot trace and the second portion of the partial hot trace, forming an augmented hot trace. Unrolling of the augmented hot trace is then performed as taught for unrolling a hot trace in application Ser. No. 10/282,811.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

The present invention provides for loop unrolling for a class of loops that have not previously been unrolled. This class of loops comprises loops that are too large to be completely unrolled, and which lack a single hot trace that covers an entire loop iteration.

Figure 1A:
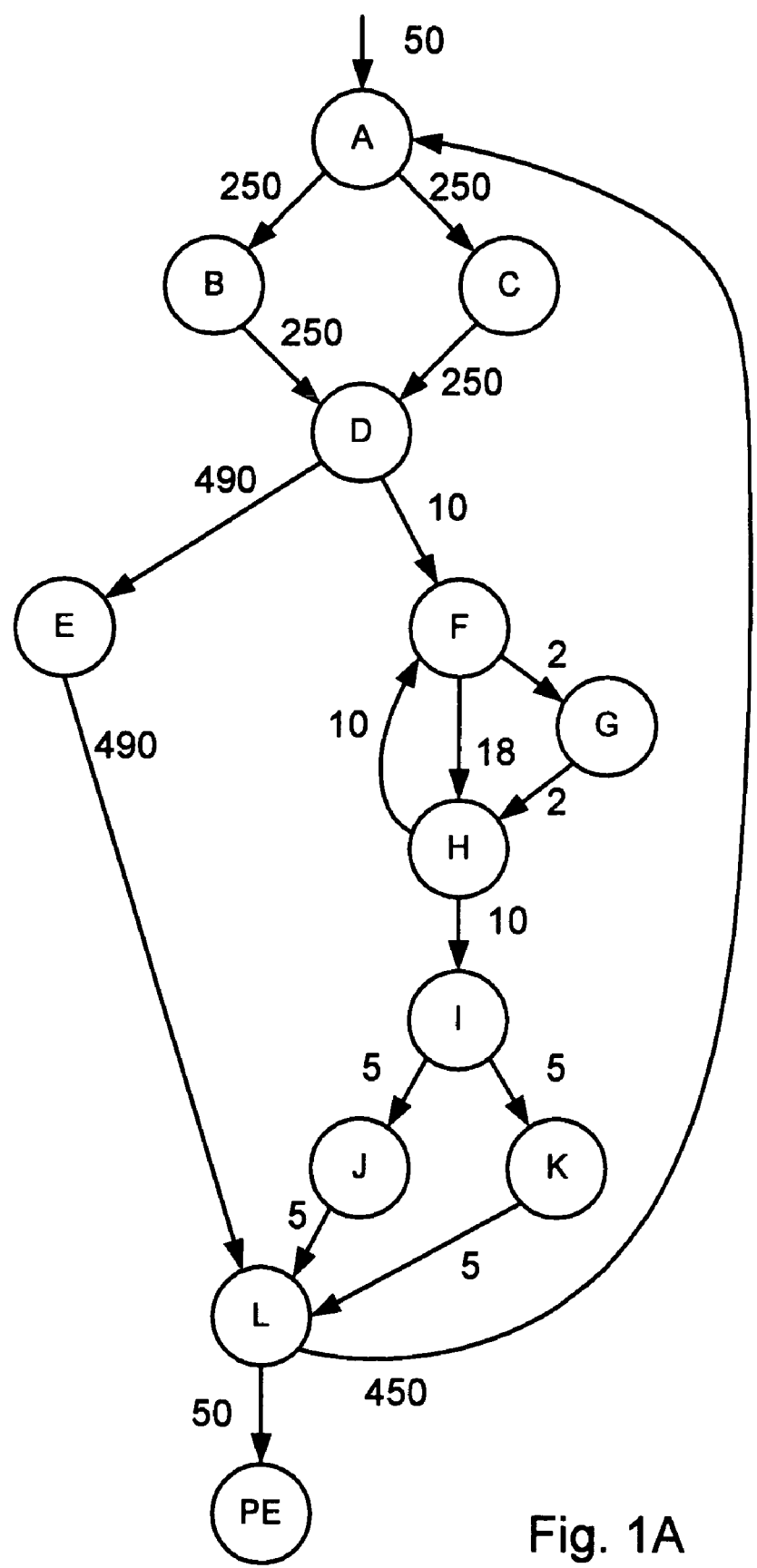
FIG. 1A shows a group of blocks in a computer program, with each transition from one block to a subsequently executed block having profiling data shown.

Turning now to FIG. 1A, a loop comprising blocks A–L is shown. Block PE is simply a loop post exit block. Profiling has been performed to determine likelihood (probabilities) of transition from one block to another, expressed as number of times the transition occurred. For example, the profiler determined that 50 transitions into the loop occurred during the period profiled. There were 250 transitions from block A to block B; 250 transitions from block A to block C. Other transition frequencies are shown next to the corresponding transition arrows. Prior compiler techniques have identified a hot trace through a loop and unrolled the trace to provide faster-running code. That is, if a sequence of blocks from a beginning of a loop to an end of a loop has a high probability of being traversed during each iteration of the loop, various trace unrolling strategies have been used. The loop shown in FIG. 1A does not have such a hot trace, since blocks B and C have similar (equal in the example of FIG. 1A) probability of being executed. Prior trace unrolling techniques are not applicable for unrolling the loop of FIG. 1A.

Figure 1B:
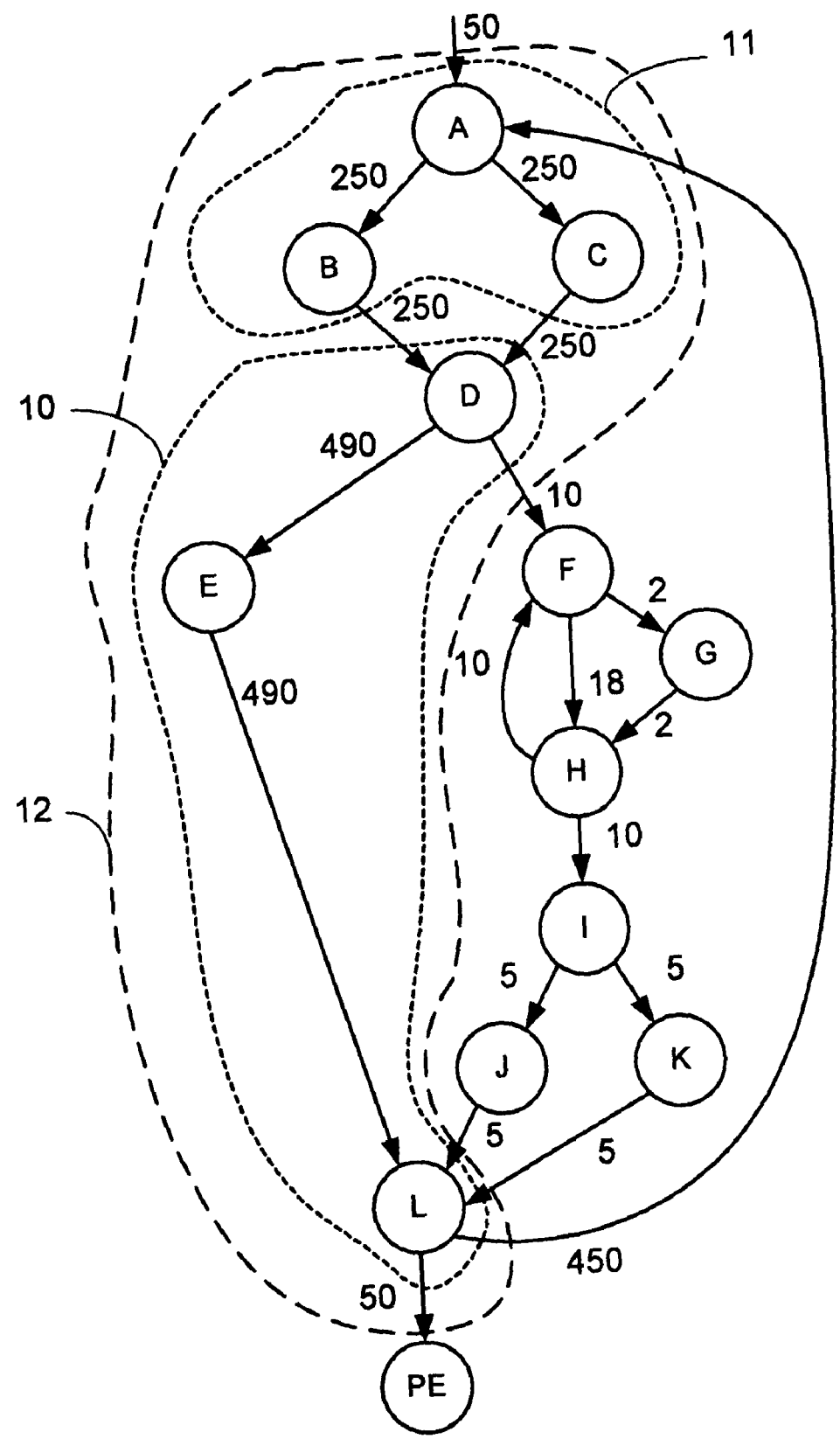
FIG. 1B shows the group of blocks of FIG. 1A, but showing identification of a partial hot trace, an augmentation path set, and an augmented hot trace.

FIG. 1B shows the loop of FIG. 1A with a further identification of groups of blocks. A partial hot trace 10 comprising blocks D, E, and L is identified using profiling data. Blocks D, E, and L are each executed 490 times according to the profiling data. However, Blocks D, E, and L do not make up a complete path from the beginning of the loop (i.e., block A) to the end of the loop (i.e., block L), and therefore is a partial hot trace.

A candidate augmentation path set 11 is identified using profiling data. A candidate augmentation path set comprises two or more blocks (A, B, and C in augmentation path set 11 in FIG. 1B), each block having a relatively high probability of being executed during an iteration of the loop under consideration, the candidate augmentation path set being executed in series with the partial hot trace.

A candidate augmentation path set has more than one path, or trace, through the candidate augmentation path set, each trace in the candidate augmentation path set having similar likelihood of being executed. A sum of the probabilities, or likelihoods, of executing each of the traces in the candidate augmentation path set is similar to (for example, within 25%) the probability of executing a particular block in the partial hot trace. For example, in partial hot trace 10, block D is executed 500 times per the profile data. Blocks E and L in partial hot trace 10 are executed 490 times each. In the identified candidate augmentation path set 11, block A is executed 500 times. Blocks C and D are each executed 250 times, for a total likelihood of 500. The likelihood of executing block B plus the likelihood of executing block C (total of 500) is similar to the number of executions of blocks in partial hot trace 10 (500 for block D; 490 for block E; 490 for block L).

Determination of optimal unrolling methods considers advantages of reducing loop overhead, (e.g., incrementing loop counters, testing against a limit, branching) versus "code bloat", where repetition of code during an unrolling process introduces large amounts of executable code, inclusion of which might cause needed cache lines to be disadvantageously replaced. For example, in FIG. 1B, if block B were to represent a very complex set of instructions resulting in several thousand bytes of instructions, consuming perhaps ten or more cache lines, block B (and hence candidate augmentation path set 11) may be rejected as an augmentation path set.

Code bloat could also arise if a candidate augmentation path set comprises a large number of similarly probable traces, even if each trace is very short. For example, in an extreme case, a candidate augmentation path set could comprise 100 equally probable traces where each trace has a 1% probability of being executed. Unrolling a loop comprising such a candidate augmentation path set would result in repeating 99 unused paths in each iteration of the unroll. Such unsuitable candidate augmentation path sets are rejected as augmentation path sets. The actual number of traces having similar probabilities in a candidate augmentation path set that will be used as an augmentation path set needs to be considered based on specific characteristics of a particular computer system. In particular, cache size, cache line size, and other factors need to be considered. Advantageously, the maximum number of traces in an acceptable candidate augmentation path set is programmable, so that experimentation can be done to determine an optimum number.

Although, as described above, an augmentation path set is accepted from a candidate augmentation path set in which the number of traces having similar probability is a determinant of selection, the number of traces is typically fairly small. Advantageously in many computer systems, an augmentation path set suitable for combining with a partial hot trace comprises two or three traces of similar probability, each trace being within 25% of the probability of execution of each of the other traces. Again, actual number of traces for acceptance must be determined for a particular computer system.

Also advantageously, a selected augmentation path set comprises a relatively few instructions in each trace through the augmentation path set. Again, the number of instructions in each trace through the augmentation path set should be relatively small, and experimentation as to practical numbers of instructions in traces through the augmentation path set is necessary. The actual number, as above for the number of traces, depends on many factors relating to a particular computer system's design. Advantageously, in many computer systems, no more than ten, and preferably no more than five instructions are executed in any trace of an augmentation path set.

In FIG. 1B, augmentation path set 11 lies between the top of partial hot trace 10 and the beginning of the loop. An augmented hot trace 12 is formed by concatenation of partial hot trace 10 and augmentation path set 11. In another embodiment, an augmentation path set lies between the bottom of the partial hot trace and the end of the loop. In yet another embodiment, a first augmentation path set lies between the top of the partial hot trace and the beginning of the loop, and a second augmentation path set lies between the bottom of the partial hot trace and the end of the loop.

Figure 1C:
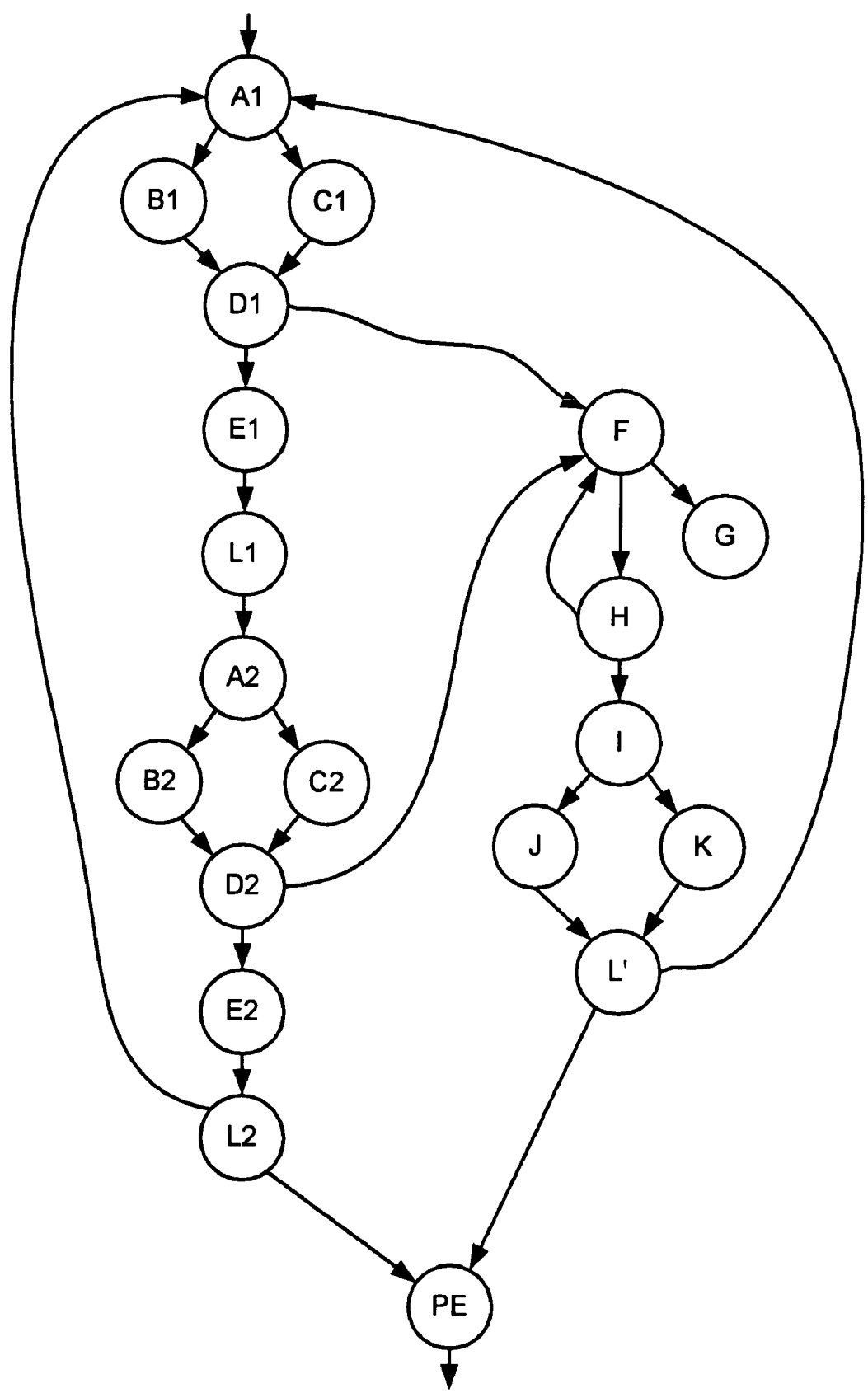
FIG. 1C shows the augmented hot trace identified in FIG. 1B unrolled.

FIG. 1C shows an example of unrolling of augmented hot trace set 12 without unrolling the entire loop. Blocks A1, B1, C1, D1, E1, and L1 make up a first unrolled iteration of the loop; blocks A2, B2, C2, D2, E2, and L2 make up a second unrolled iteration of the loop. A1 and A2 (and similarly, B1 and B2, etc) are code instances of similarly named blocks in FIGS. 1A and 1B, without the numeric suffixes (e.g., A1 and A2 are instances of A). Rarely executed code ("cold traces") is not unrolled, as doing so would tend to "bloat" the resultant code, as well as to introduce complexities that could lead to nonoptimal code, poor use of cache memory, or both. Branching to the rarely executed code (blocks F, G, H, I, J, K) is performed when needed from blocks D1 and D2. A separate instantiation of block L (L' in FIG. 1C) is created in the set of rarely executed code to complete the loop in the example, thereby avoiding a branch back into the augmented hot trace from blocks J and K. Count rectification and other considerations of loop unrolling is performed as known by those skilled in the art, in particular, as taught in Ser. No. 10/282,811. The number of repetitions of an augmented hot trace such as augmented hot trace 12 in FIG. 1B can be any number, as will be appreciated by those skilled in the art.

Figure 2A:
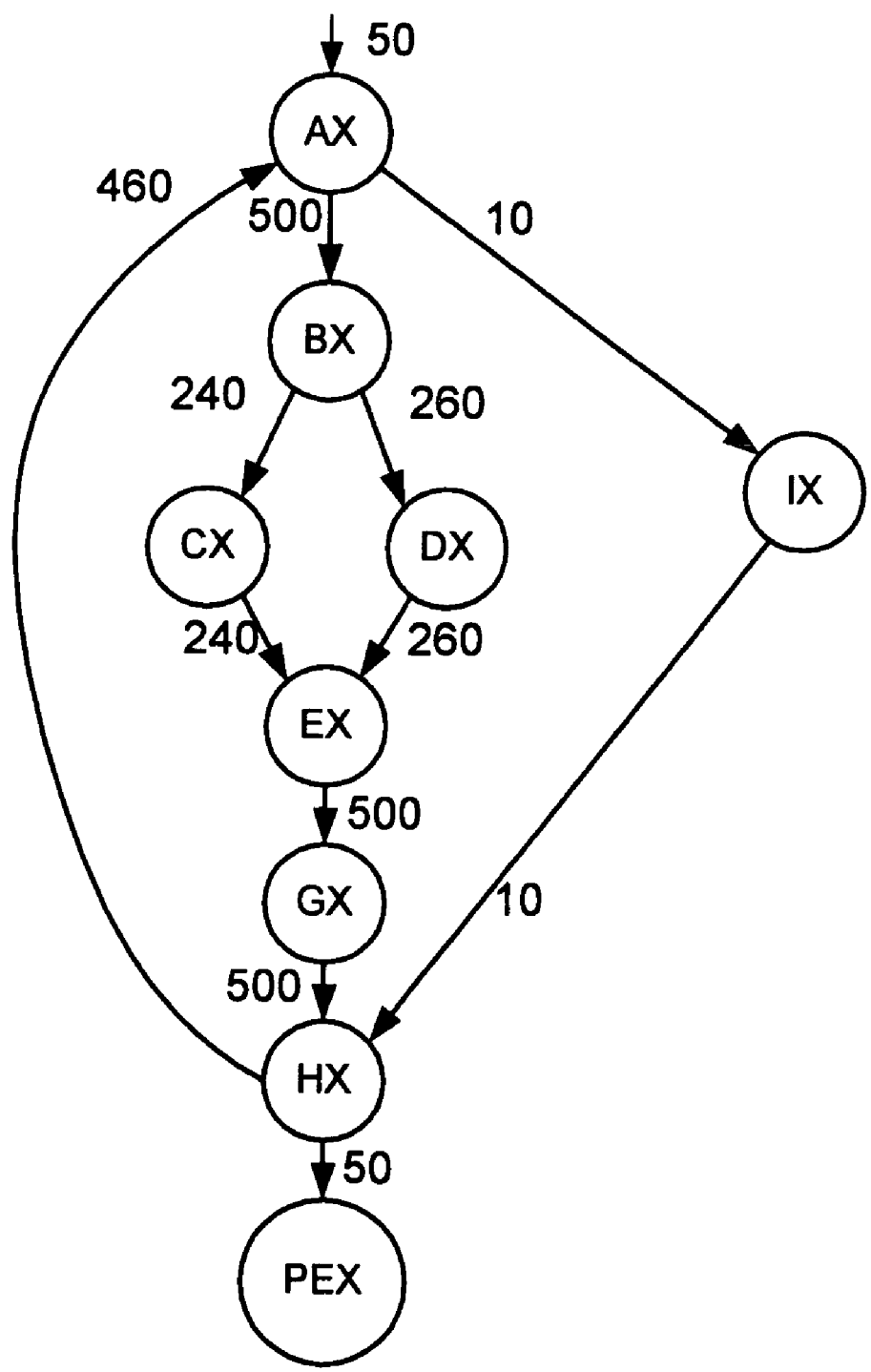
FIG. 2A shows a group of blocks in a computer program, with each transition from one block to a subsequently executed block having profiling data shown.

FIG. 2A shows another loop that can be considered for partial unrolling that has not been capable of being partially unrolled before. As with the example loop of FIG. 1A, exemplary profiling data is associated with each transition. The loop begins with block AX and ends with block HX. Block PEX is a post exit block. Block IX is seen to be rarely executed.

Figure 2B:
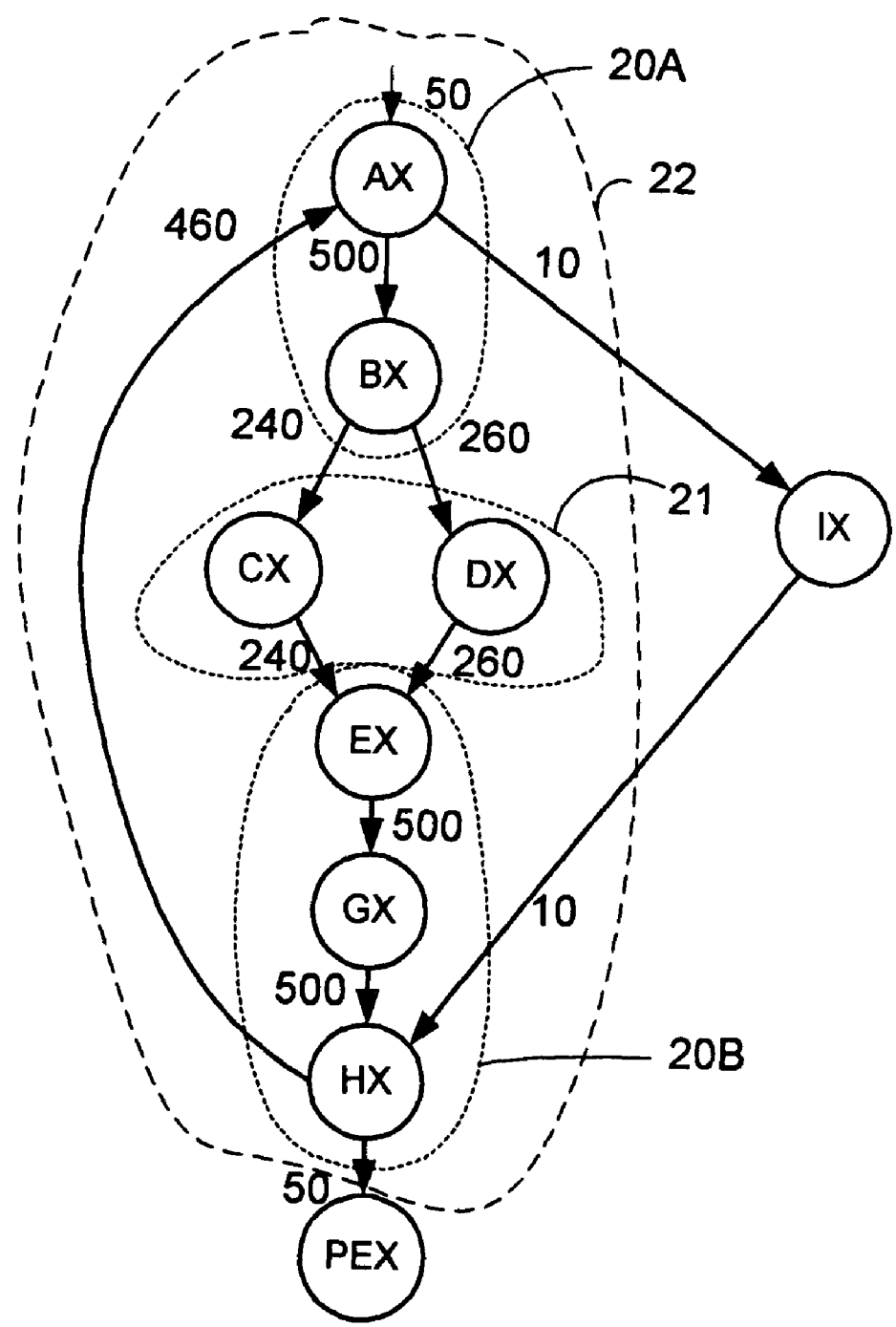
FIG. 2B shows the group of blocks of FIG. 2A, but showing identification of multiple partial hot traces, the partial hot traces being separated by an augmentation path set; and an augmented hot trace.

FIG. 2B shows an identification of two partial hot traces. A first partial hot trace 20A comprises blocks AX and BX. A second partial hot trace 20B comprises blocks EX, GX, and HX. Blocks CX, and DX are identified as an augmentation path set 21; profiling data showing similar frequencies of transitions through CX and DX. As discussed before, even though augmentation path set 21 has been identified as a candidate augmentation path set, it advantageously is further examined to determine if it is suitable for being repeated in an unrolling of the loop. As before, code size (e.g., number of bytes of instructions and number of traces in a particular candidate augmentation path set) must be examined for suitability for selection of the candidate augmentation path set as an augmentation path set. The example of FIG. 2B and FIG. 2C assumes selection as an augmentation path set.

Figure 2C:
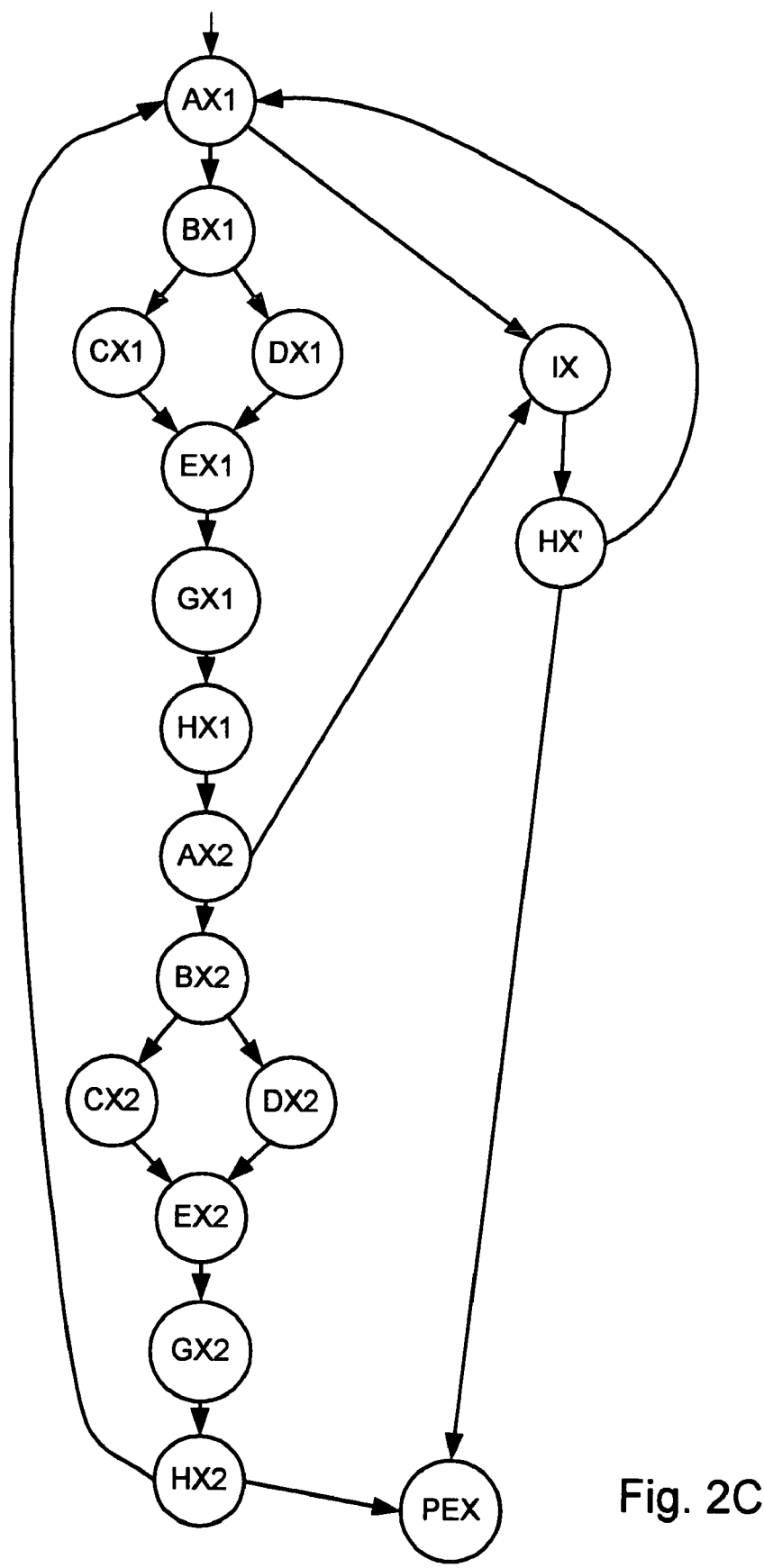
FIG. 2C shows the augmented hot trace of FIG. 2B unrolled.

FIG. 2C shows the loop of FIGS. 2A and 2B partially unrolled, with two iterations of the loop partially unrolled. Similarly named blocks (with numeric suffixes) are instances of the same block of the original loop. For example, Blocks AX1 and AX2 are instances of block AX. IX is a block in a "cold trace" (seldomly executed) and is not unrolled. A separate instance HX' of the last block in the loop (i.e., HX) is placed after IX, in order to avoid branching back into the augmented hot trace.

As before, to be accepted as an augmentation path set, the number of traces in a candidate augmentation path set and the number of instructions in a particular trace in a candidate augmentation path set are limited by considerations related to performance of the loop. These considerations include such system specifics as cache line size and cache size.

As before, the number of iterations that are unrolled is determined by tradeoffs known in the art. Any number of iterations is contemplated.

Figure 3:
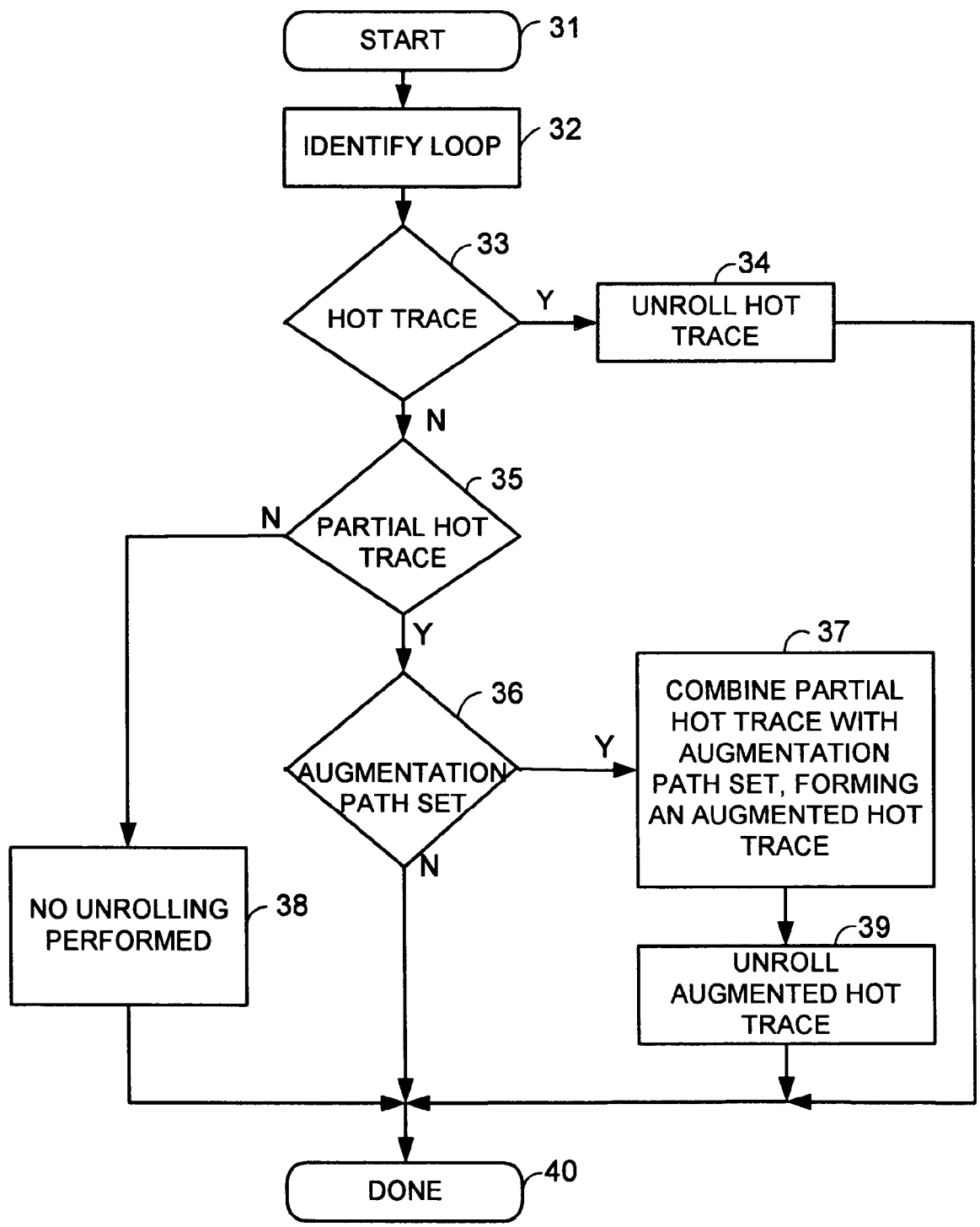
FIG. 3 is a flow diagram describing a method of unrolling loops, including unrolling augmented hot traces.

FIG. 3 shows a flowchart of an embodiment of a method to examine a program and produce partially unrolled loops, including unrolled augmented hot traces. Whereas the flowchart of FIG. 3 shows the method used once to partially unroll a loop, the method can be used for any and all instances of loops.

The method begins with step 31.

In step 32, a loop in the program's code is identified. The loop is first examined for a hot trace that extends from a beginning of the loop to an end of the loop. If such a hot trace exists, the hot trace is unrolled in step 34.

If a hot trace does not exist, control passes to step 35, where the loop is further examined for presence of a partial hot trace. If no partial hot trace is found, no unrolling of the loop is performed, as shown in block 38. If, however, one or more partial hot traces are found, control passes to step 36 which further examines the loop for existence of a candidate augmentation path set. Step 36 examines candidates for augmentation path sets for suitability, as described earlier (e.g., amount of code in each trace in the candidate augmentation path set and number of traces in the candidate augmentation path set). If one or more augmentation path sets are found, control passes to step 37, which combines the one or more partial hot traces with the one or more augmentation path sets to form an augmented hot trace. Step 39 partially unrolls the augmented hot trace with "cold blocks" not being unrolled.

Step 40 ends one iteration of the method. Typically, this method is used for each loop in the program under consideration.

Figure 4A:
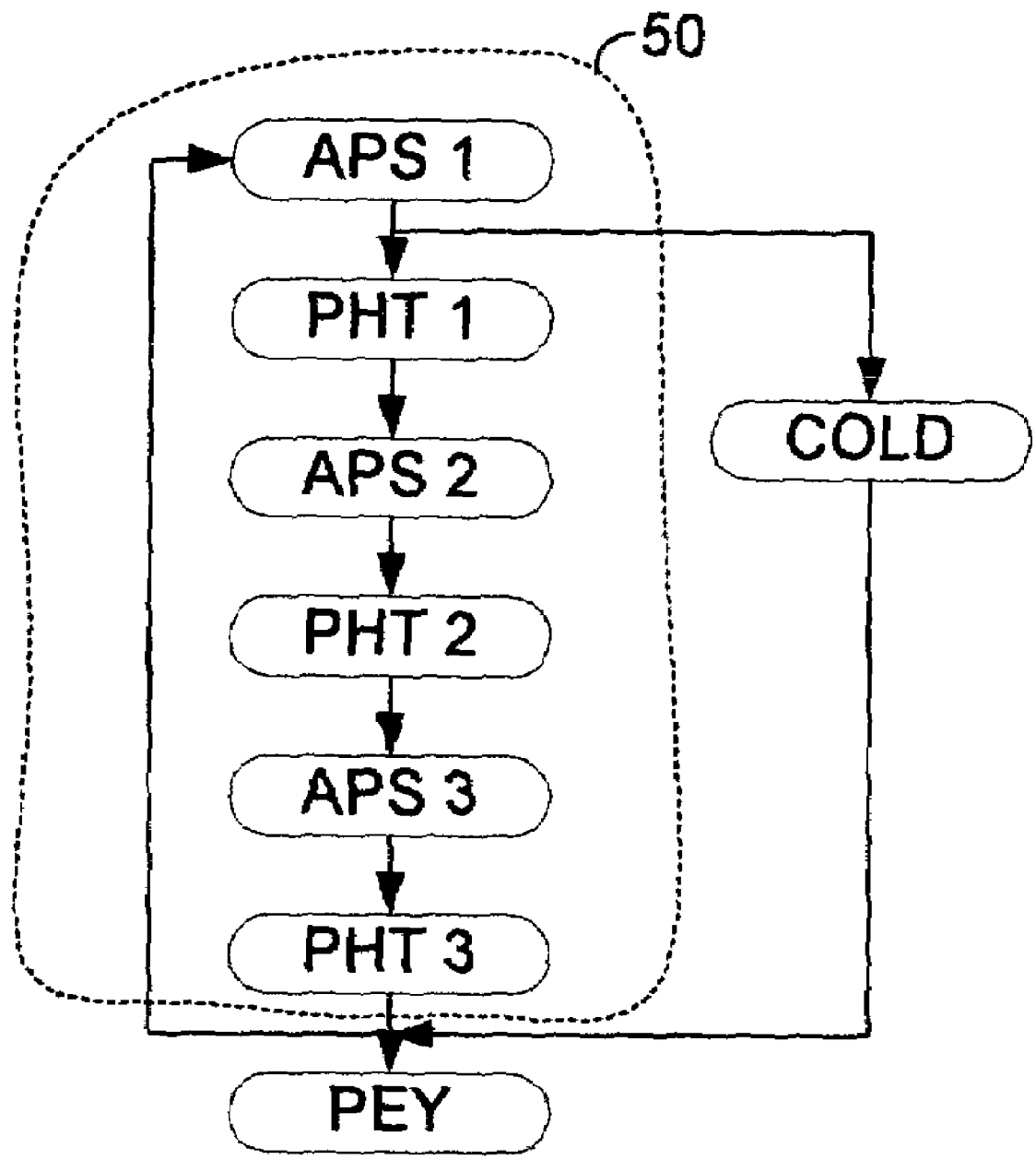
FIG. 4A shows multiple augmentation path sets and multiple partial hot traces occurring in a loop, comprising an augmented hot trace.

FIG. 4A illustrates the case where partial hot traces exist within a method, interspersed with augmentation path sets. The augmented hot trace 50 in FIG. 4A is composed of a series of augmented path sets (APS1, APS2, APS3) and partial hot traces (PHT1, PHT2, PHT3). Using profile data, cold traces such as COLD in FIG. 4A are excluded from the unrolling process resulting in a partially unrolled loop. PEY is the method exit point.

Figure 4B:
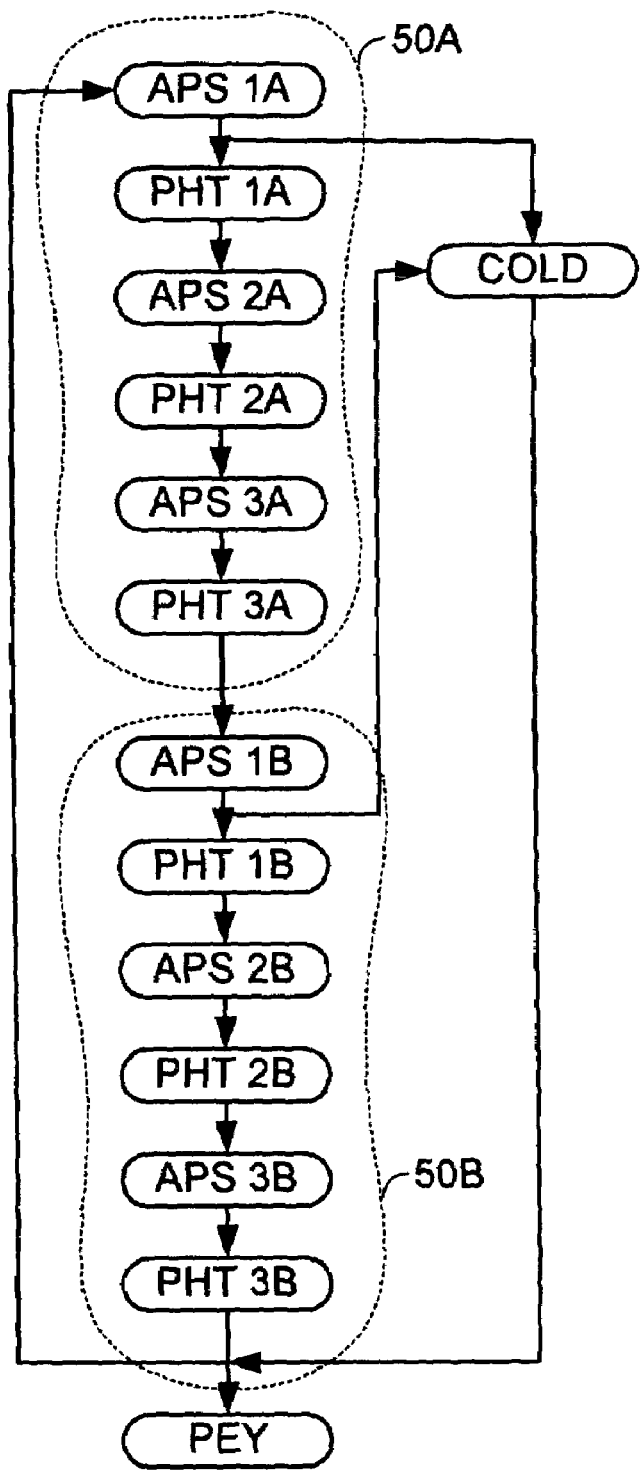
FIG. 4B shows the augmented hot trace of FIG. 4A unrolled.

FIG. 4B shows the loop of FIG. 4A partially unrolled. In FIG. 4B, each unique augmentation path set (APS) and partial hot trace (PHT) is identified by a numerical and an alphabetic suffix following the APS and PHT labels which comprise the augmented hot trace. The numerical suffix identifies each APS and PHT combination that comprises the augmented hot traces of 50A and 50B. The alphabetic suffix indicates how many instances of a particular hot trace have been partially unrolled—in the case of FIG. 4B, the loop in FIG. 4A has been partially unrolled twice; once instance of augmented hot trace 50 as indicated by augmented hot trace 50A and another instance of augmented hot trace 50, augmented hot trace 50B. Using profile data, each of the unique augmented hot traces in the loop is advantageously unrolled while each cold trace, e.g. COLD in FIG. 4B, is not unrolled.

The method described can be executed by a program product, such as a compiler. The program product contains instructions, that when executed by a suitable computer, perform the steps of the method. The program product resides on a computer readable media including but not limited to floppy disks, CD-ROMs, DVD disks, and magnetic tapes. The computer readable media can also be a network interface, such as the Worldwide Web, or any network coupling computers together over which program products may be transmitted. The present invention contemplates any media upon which a program product may be stored or over which a program product can be distributed.

While the foregoing is directed to embodiments of the present invention, other and further embodiments of the invention may be devised without departing from the basic scope thereof, and the scope thereof is determined by the claims that follow.

What is claimed is:

1. A method for optimizing a loop in an instruction stream of a computer program, the method comprising the steps of:
   identifying a partial hot trace using profile data;
   identifying an augmented hot trace set of instructions comprising a proper superset of the partial hot trace, but comprising a proper subset of the entire loop, and which forms a complete loop iteration;
   optimizing the loop in the instruction stream of the computer program by unrolling the augmented hot trace set of instructions without unrolling the entire loop;
   identifying an augmentation path set using the profile data;
   combining the augmentation path set with the partial hot trace to form the augmented hot trace set of instructions; and
   the step of identifying an augmentation path set using the profile data further comprising the step of:
      identifying a candidate augmentation path set of instructions having more than one trace through the candidate augmentation path set of instructions, and more than one of the traces having similar probabilities of being executed during an iteration of the loop, the sum of the probabilities of the one or more traces through the set being similar to the probability of execution of the partial hot trace.

2. The method of claim 1, the step of identifying an augmentation path set further comprising the step of eliminating a particular candidate augmentation path set having a trace having more than a predetermined number of instructions.

3. The method of claim 2, wherein the predetermined number of instructions is determined by consideration of system performance.

4. The method of claim 2, wherein the predetermined number of instructions is 10.

5. The method of claim 2, wherein the predetermined number of instructions is 5.

6. The method of claim 1, the step of identifying an augmentation path set further comprises the step of eliminating a particular candidate augmentation path set having more than a predetermined number of traces.

7. The method of claim 6, wherein the predetermined number of traces is determined by consideration of system performance.

8. The method of claim 6, wherein the predetermined number of traces is 3.

9. The method of claim 6, wherein the predetermined number of traces is 2.

10. A program product, stored on a computer readable medium, which, when executed by a suitable computer, performs a method of optimizing a loop in an instruction stream of a computer program, the method comprising the steps of:
    identifying a partial hot trace using profile data,
       identifying an augmented hot trace set of instructions comprising a proper superset of the partial hot trace, but comprising a proper subset of the entire loop, and which forms a complete loop iteration;
       unrolling the augmented hot trace set of instructions without unrolling the entire loop;
       identifying an augmentation path set using the profile data;
       combining the augmentation path set with the partial hot trace to form the augmented hot trace set of instructions; and
    the step of identifying an augmentation path set using the profile data further comprising the step of identifying a candidate augmentation path set of instructions having more than one trace through the candidate augmentation path set of instructions, and more than one of the traces having similar probabilities of being executed during an iteration of the loop, the sum of the probabilities of the one or more traces through the set being similar to the probability of execution of the partial hot trace.

11. The program product of claim 10, the step of identifying an augmentation path set using profile data further comprising the step of eliminating a candidate augmentation path set having a trace with more than a predetermined number of instructions.

12. The program product of claim 11, wherein the predetermined number of instructions is determined by consideration of system performance.

13. The program product of claim 11, wherein the predetermined number of instructions is 10.

14. The program product of claim 11, wherein the predetermined number of instructions is 5.

15. The program product of claim 10, the step of identifying an augmentation path set using profile data further comprising the step of eliminating a candidate augmentation path set having more than a predetermined number of traces.

16. The program product of claim 15, wherein the predetermined number of instructions is determined by consideration of system performance.

17. The program product of claim 15, wherein the predetermined number of traces is 3.

18. The program product of claim 15, wherein the predetermined number of traces is 2.

* * * * *